(12) United States Patent
Kim et al.

(10) Patent No.: US 11,614,567 B2
(45) Date of Patent: Mar. 28, 2023

(54) LOW REFRACTIVE LAYER AND ANTI-REFLECTIVE FILM COMPRISING THE SAME

(71) Applicant: LG CHEM, LTD., Seoul (KR)

(72) Inventors: Boo Kyung Kim, Daejeon (KR); Yeong Rae Chang, Daejeon (KR); Seok Hoon Jang, Daejeon (KR); Eun Kyu Her, Daejeon (KR); Jin Seok Byun, Daejeon (KR)

(73) Assignee: LG CHEM, LTD., Seoul (KR)

(*) Notice: Subject to any disclaimer, the term of this patent is extended or adjusted under 35 U.S.C. 154(b) by 64 days.

(21) Appl. No.: 16/921,285

(22) Filed: Jul. 6, 2020

(65) Prior Publication Data

US 2020/0333509 A1   Oct. 22, 2020

Related U.S. Application Data

(60) Division of application No. 15/639,669, filed on Jun. 30, 2017, now abandoned, which is a continuation of
(Continued)

(30) Foreign Application Priority Data

Aug. 18, 2015 (KR) .................. 10-2015-0116260
Aug. 17, 2016 (KR) .................. 10-2016-0104409

(51) Int. Cl.
*G02B 1/111* (2015.01)
*G02B 1/14* (2015.01)
(Continued)

(52) U.S. Cl.
CPC ............ *G02B 1/111* (2013.01); *C08G 65/007* (2013.01); *C09D 5/00* (2013.01); *G02B 1/14* (2015.01)

(58) Field of Classification Search
CPC .............. G02B 1/111; G02B 1/14; G02B 1/11
(Continued)

(56) References Cited

U.S. PATENT DOCUMENTS 9,606,267 B2    3/2017   Yang et al.
2004/0137234 A1   7/2004   Stachowiak
(Continued)

FOREIGN PATENT DOCUMENTS

CN      101957461 A      1/2011
CN      102153292 A      8/2011
(Continued)

OTHER PUBLICATIONS

Seita Tajima, Silsesquioxane derivative "SQ Series" Institute for New Product Development, Jan. 1, 2004, pp. 37-41, with English translation.

*Primary Examiner* — Audrey Y Chang
(74) *Attorney, Agent, or Firm* — Rothwell, Figg, Ernst & Manbeck, P.C.

(57) ABSTRACT

The present invention relates to a low refractive layer and an anti-reflective film comprising the same. The low refractive layer can exhibit excellent optical properties such as a low reflectance and a high light transmittance, and excellent mechanical properties such as high wear resistance and scratch resistance at the same time, without adversely affecting the color of the polymer resin forming the low refractive layer. In particular, due to the excellent alkali resistance, the low refractive layer can maintain excellent physical properties even after alkali treatment. Therefore, when introducing a low refractive layer to the display device, it is expected that the production process can be simplified and further the production rate and the productivity can significantly increase.

14 Claims, 4 Drawing Sheets

Related U.S. Application Data application No. PCT/KR2016/009111, filed on Aug. 18, 2016.

(51) Int. Cl.
 *C09D 5/00* (2006.01)
 *C08G 65/00* (2006.01)

(58) Field of Classification Search
 USPC .............................. 525/200; 428/1.31, 421
 See application file for complete search history.

(56) References Cited

U.S. PATENT DOCUMENTS

| | | | |
|---|---|---|---|
| 2006/0051585 A1 | 3/2006 | Mikami et al. | |
| 2007/0146887 A1 | 6/2007 | Ikeda et al. | |
| 2007/0185298 A1 | 8/2007 | Baikerikar et al. | |
| 2007/0212498 A1* | 9/2007 | Fukushige | G02B 1/111 428/1.31 |
| 2008/0088925 A1* | 4/2008 | Yoneyama | B32B 3/20 359/488.01 |
| 2008/0138606 A1 | 6/2008 | Yoshihara et al. | |
| 2008/0239488 A1 | 10/2008 | Asakura et al. | |
| 2010/0092895 A1 | 4/2010 | Zhang et al. | |
| 2010/0249265 A1* | 9/2010 | Engardio | G02B 1/105 523/107 |
| 2012/0003467 A1 | 1/2012 | Suzuki et al. | |
| 2012/0019915 A1 | 1/2012 | Yan | |
| 2016/0053101 A1* | 2/2016 | Radice | C08G 65/007 525/200 |

FOREIGN PATENT DOCUMENTS

| | | |
|---|---|---|
| CN | 104345371 A | 2/2015 |
| EP | 3085673 A1 | 10/2016 |
| EP | 3243884 A1 | 11/2017 |
| JP | 07252634 A | 10/1995 |
| JP | 2000334881 A | 12/2000 |
| JP | 2001-207115 A | 7/2001 |
| JP | 2005-077860 A | 3/2005 |
| JP | 2005-089536 A | 4/2005 |
| JP | 2006047504 A | 2/2006 |
| JP | 2006-079068 A | 3/2006 |
| JP | 2006063147 A | 3/2006 |
| JP | 2006-522861 A | 10/2006 |
| JP | 2007-070523 A | 3/2007 |
| JP | 2007-132990 A | 5/2007 |
| JP | 2007196164 A | 8/2007 |
| JP | 2008-127413 A | 6/2008 |
| JP | 2008-134585 A | 6/2008 |
| JP | 2008-248214 A | 10/2008 |
| JP | 2008-262187 A | 10/2008 |
| JP | 2009-042351 A | 2/2009 |
| JP | 2009168986 A | 7/2009 |
| JP | 2009244468 A | 10/2009 |
| JP | 2010084017 A | 4/2010 |
| JP | 2010-139941 A | 6/2010 |
| JP | 2010-519398 A | 6/2010 |
| JP | 4544952 B2 | 7/2010 |
| JP | 2010-254950 A | 11/2010 |
| JP | 2010-286803 A | 12/2010 |
| JP | 2012-072269 A | 4/2012 |
| JP | 2012214004 A | 11/2012 |
| JP | 2013-156331 A | 8/2013 |
| JP | 2013-203805 A | 10/2013 |
| JP | 2014-041298 A | 3/2014 |
| JP | 2014-152246 A | 8/2014 |
| JP | 2014192341 A | 10/2014 |
| JP | 2015-200840 A | 11/2015 |
| KR | 1020060051029 A | 5/2006 |
| KR | 1020060111622 A | 10/2006 |
| KR | 1020060134100 A | 12/2006 |
| KR | 1020070048727 A | 5/2007 |
| KR | 1020140065250 A | 5/2014 |
| KR | 1020140138262 A | 12/2014 |
| KR | 1020140140139 A | 12/2014 |
| KR | 10-2016-0019367 A | 2/2016 |
| WO | 2011-013611 A1 | 2/2011 |
| WO | 2015093322 A1 | 6/2015 |

* cited by examiner

[FIG. 1]
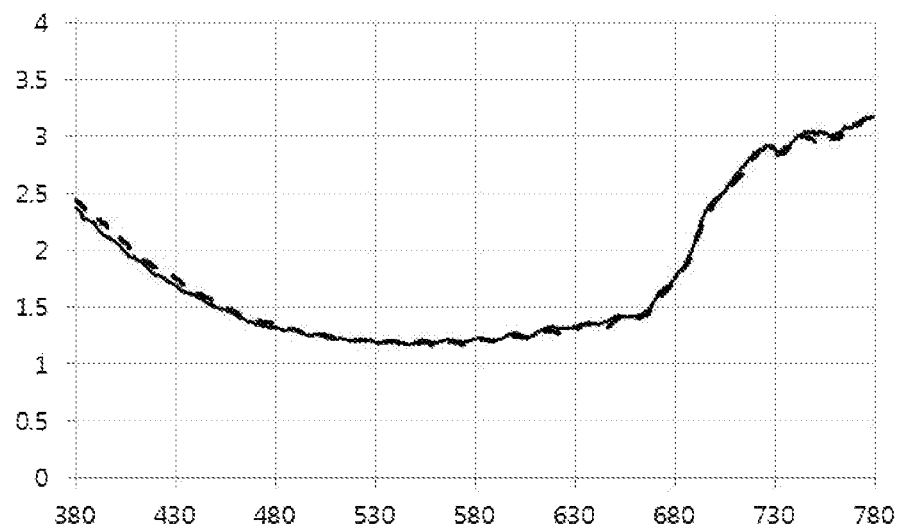
[FIG. 2]
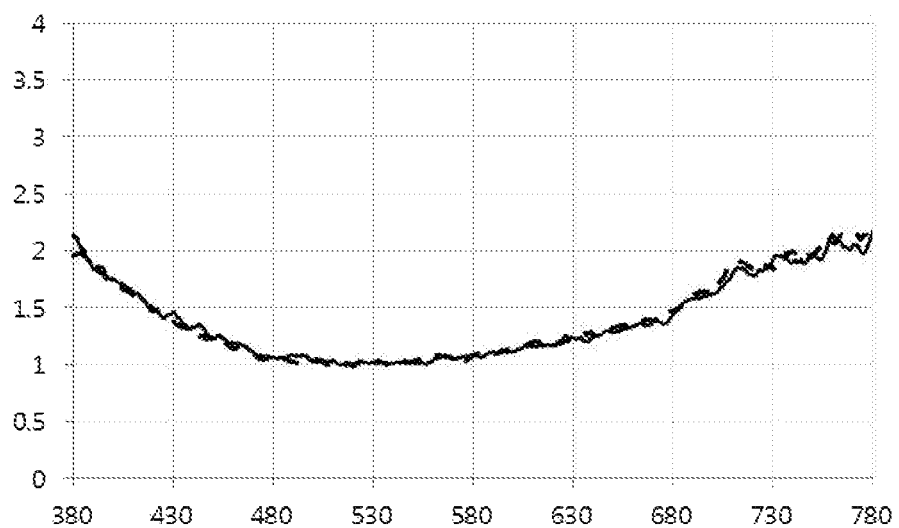

【FIG. 3】
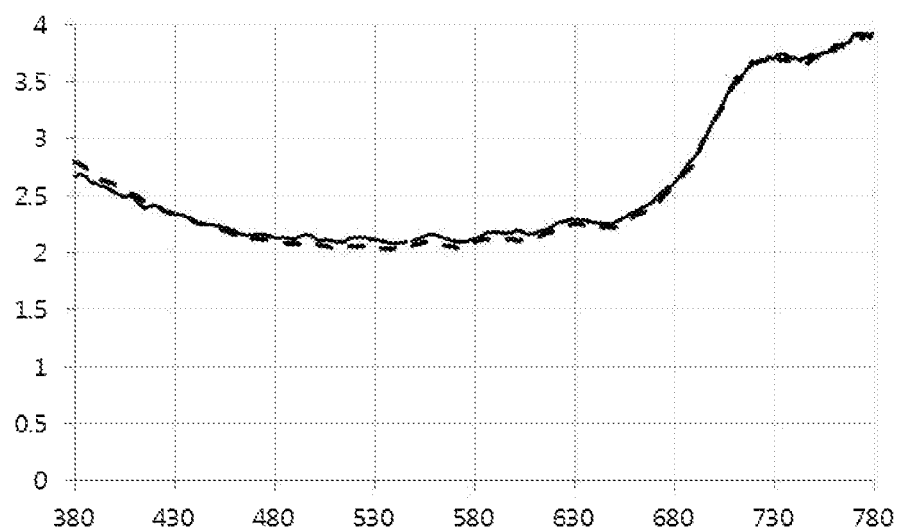
【FIG. 4】
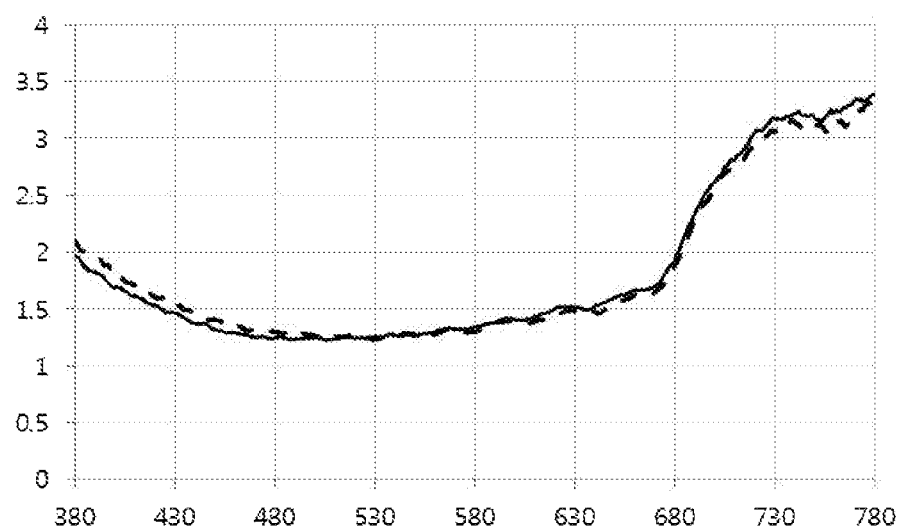

【FIG. 5】
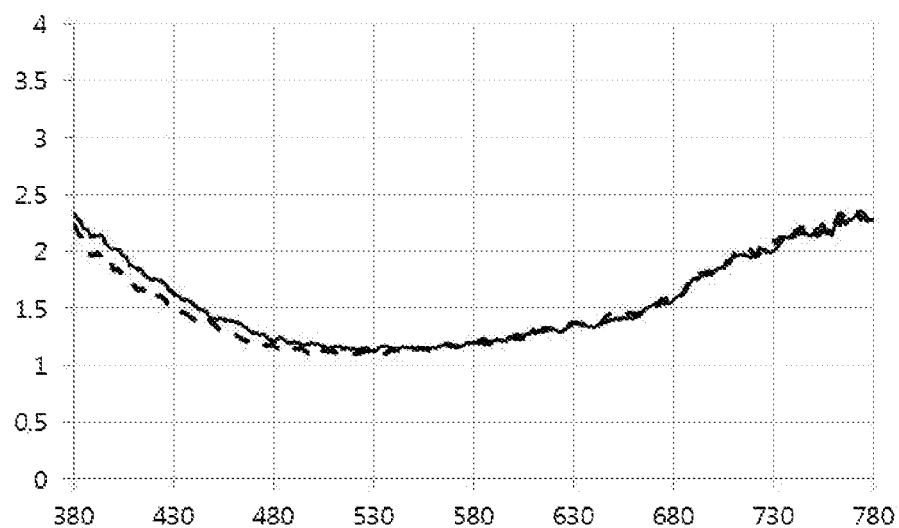
【FIG. 6】
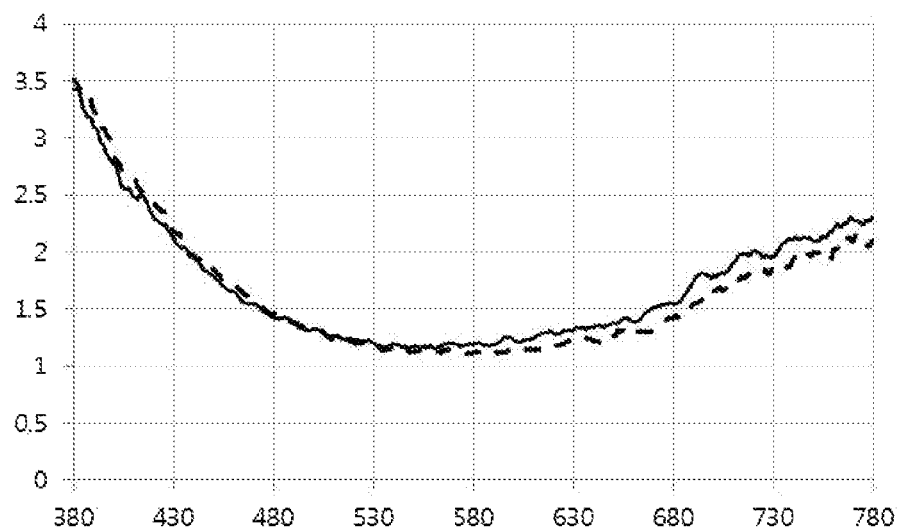

[FIG. 7]
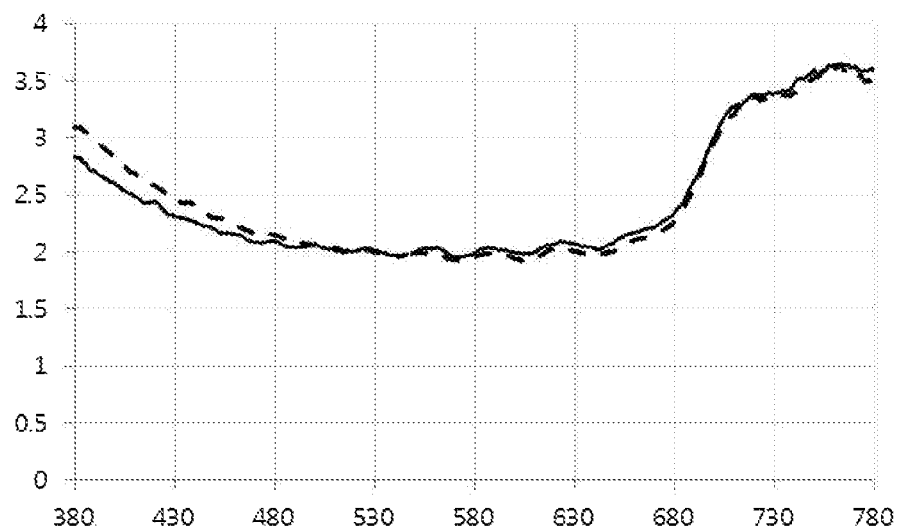
[FIG. 8]
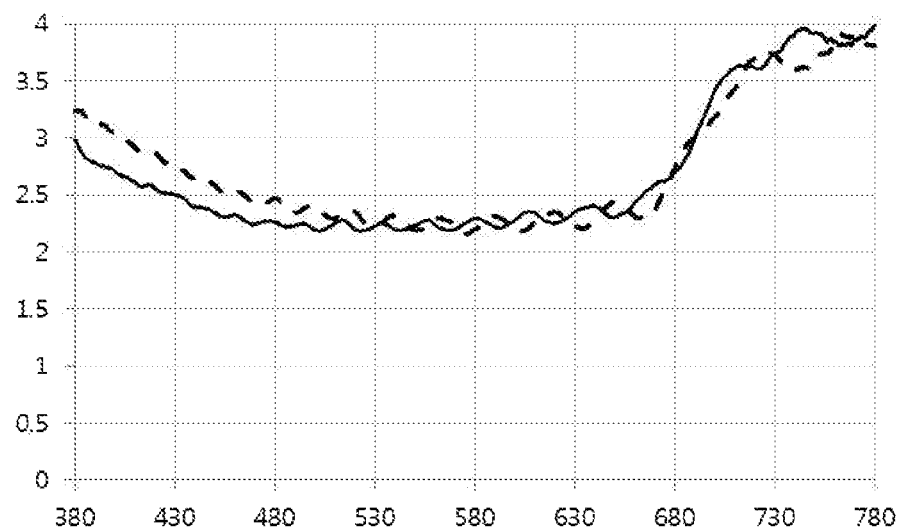

LOW REFRACTIVE LAYER AND ANTI-REFLECTIVE FILM COMPRISING THE SAME

CROSS-REFERENCE TO RELATED APPLICATIONS

This application is a Divisional of U.S. application Ser. No. 15/639,669 filed on Jun. 30, 2017, which is a Continuation Bypass of International Application No. PCT/KR2016/009111, filed Aug. 18, 2016, which claims the benefit of Korean Patent Application No. 10-2015-0116260 on Aug. 18, 2015 and Korean Patent Application No. 10-2016-0104409 on Aug. 17, 2016 with the Korean Intellectual Property Office, the disclosures of which are herein incorporated by reference in their entirety.

TECHNICAL FIELD

The present invention relates to a low refractive layer and an anti-reflective film comprising the low refractive layer and a hard coating layer.

BACKGROUND OF ART

In general, a flat panel display device such as TOP or LCD is equipped with an anti-reflective film to minimize the reflection of light made incident from the outside.

As a method for minimizing the reflection of light, a method of dispersing a filler such as inorganic fine particle to a resin and coating the filler on a substrate film to impart irregularities (anti-glare: AG coating); a method of utilizing an interference of light by forming a plurality of layers having refractive indexes different from each other on a substrate film (anti-reflection: AR coating); or a method of utilizing a combination thereof have been known.

Among them, in case of the AG coating, the absolute amount of the reflected light is a level equivalent to a conventional hard coating, but a low-reflection effect can be obtained by reducing the amount of light entering the eye using the scattering of light through the irregularities. However, in the AG coating, the screen resolution degrades due to surface irregularities. Thus, in recent years, many studies have been made about the AR coating.

As the film using the AR coating, those having a multilayer structure wherein a hard coating layer (high refractive index layer), a low-reflection coating layer or the like are laminated on a substrate film have been commercialized. However, a method of forming a plurality of layers as described above has a drawback that as the steps of forming the respective layers are separately performed, the interlayer adhesion (interfacial adhesion) is weakened, and thereby the scratch resistance is poor and the production cost is high.

Accordingly, many studies have been performed to reduce the absolute amount of reflection of light made incident from the outside and to improve the scratch resistance of the surface, but the degree of improving the physical properties associated therewith is insufficient. In addition, a method of adding an inorganic additive or the like in order to improve the scratch resistance of a polymer film that is applied to the anti-reflective film, has been known. However, according to this known method, since the alkali resistance of the polymer film is greatly decreased, there was a limit that applying to the process for the production of a polarizing plate or the like is incompatible.

DETAILED DESCRIPTION OF THE INVENTION

Technical Problem

An object of the present invention is to provide a low refractive layer capable of exhibiting excellent optical properties and mechanical properties.

Another object of the present invention is to provide an anti-reflective film comprising the low refractive layer.

Technical Solution

Hereinafter, a low refractive layer and an anti-reflective film comprising the same according to specific embodiments of the present invention will be described in more detail.

According to an embodiment of the invention, there is provided a low refractive layer satisfying the following formula 1.

$$0.5 \geq \Delta b^* = |b^*_1 - b^*_0| \qquad \text{[Formula 1]}$$

In the formula 1,
$b^*_0$ is a b* value in a L*a*b* color coordinate system as defined by the International Commission on Illumination as to the low refractive layer, and
$b^*_1$ is a b* value in a L*a*b* color coordinate system as measured in the same manner as a method for measuring $b^*_0$ as to the film prepared by immersing the low refractive layer for 2 minutes in 10 wt % sodium hydroxide aqueous solution heated to 30° C., washing the immersed layer with water, wiping moisture off, followed by immersing the wiped layer for 30 seconds in 10 wt % sodium hydroxide aqueous solution heated to 55° C., washing it with water and wiping off moisture.

As used herein, the term "low refractive layer" may refer to a layer having a low refractive index. For example, it may refer to a layer exhibiting a refractive index of about 1.2 to 1.6.

The low refractive layer according to an embodiment of the invention has excellent properties including optical properties such as reflectance and color in visible light region and mechanical properties such as scratch resistance. Therefore, the low refractive layer is used in a display device and can greatly prevent a glaring phenomenon caused by light made incident from the outside of the device without deterioration of the image. The surface of the device can be effectively protected from external impact or stimulation and the like.

In addition, the low refractive layer has properties that cause very little change in the above-described physical properties, even when exposed to an alkali. Due to this high alkali resistance, the low refractive layer can omit the process for attaching and detaching a protective film which is essentially performed to protect a low refractive layer during the production process of the display device. Thereby, the production process of the display device is simplified and the production costs can be reduced. In particular, it is expected that the low refractive layer is excellent in alkali resistance at high temperature and thus the conditions for the production process of the display device can be adjusted to more severe conditions, thereby greatly improving the production rate and the productivity without degrading the quality of the device.

More specifically, the low refractive layer can satisfy the above-described formula 1. In the formula 1, $b^*_0$ is a value that can evaluate an initial color of the low refractive layer, and $b^*_1$ is a value that can evaluate a color of the alkali-treated low refractive layer. In this case, the low refractive layer is treated with alkali twice. In particular, the second alkali treatment is carried out by a sodium hydroxide aqueous solution at high temperature. Thus, the alkali resistance of the low refractive layer at high temperature can be evaluated through the extent of the change in the color of the low refractive layer before and after the alkali treatment according to the formula 1. The alkali treatment conditions are as described in the formula 1, and for more details related to the alkali treatment refer to Experimental Examples which will be described later. In addition, for more details related to the evaluation method of the b* value in L*a*b* color coordinate system as to the low refractive layer before and after the alkali treatment refer to Experimental Examples which will be described below.

The low refractive layer according to one embodiment of the invention has excellent alkali resistance and thereby the degree of color change (Δb*) before and after the alkali treatment according to the formula 1 may be 0.5 or less, 0.45 or less, or 0.4 or less. The low refractive layer is likely to have no color change even after alkali treatment at high temperature, and thus Δb* in the formula 1 may be zero.

In a conventional refractive layer, inorganic fillers have been added to exhibit a low refractive index in a visible light range or to improve a scratch resistance. However, these fillets greatly decreased the alkali resistance of the low refractive layer, and this made it difficult to apply the low refractive layer to the production process of the display which is essentially accompanied by the alkali treatment process. There was a problem that it adversely affects the image quality of the display device by coloring the low refractive layer.

However, the low refractive layer according to one embodiment of the invention can exhibit properties such as excellent scratch resistance and alkali resistance, without color change, or while minimizing color change, for the polymer resin contained in the low refractive layer. As one example, the b* value ($b*_0$ value in the formula 1) before and after the alkali treatment of the low refractive layer may be from 1 to −8, from −2.27 to −8 or from 1 to −5.

If the b* value in the L*a*b* color coordinate system is a positive number, it represents a color biased toward yellow. If the b* value is a negative number, it represents a color biased toward blue. Therefore, the low refractive layer according to one embodiment of the invention represents a color coordinate value as described above, and thus can effectively prevent the glaring phenomenon while transmitting an image as it is, without changing the image quality of the display device.

Additionally, the low refractive layer according to one embodiment of the invention exhibits excellent alkali resistance and thus characteristics having no color change even when exposed to an alkali at high temperature. As an example, the b* value ($b*_1$ value in the formula 1) after alkali treatment of the low refractive layer may be from 1.5 to −8.5, from −1.84 to −8.5, from 1 to −8, from 0 to −8 or from 1.5 to −5.5.

Meanwhile, the low refractive layer according to an embodiment of the invention can satisfy the following formula 2 due to its excellent alkali resistance:

$$30\% \geq \Delta S = [(S_0 - S_1)/S_0] \times 100 \quad \text{[Formula 2]}$$

in the formula 2, $S_0$ is the maximum load that scratches are not generated, when rubbing the surface of the low refractive layer while applying a load to a grade #0000 steel wool and reciprocating ten times at a speed of 24 rpm; and $S_1$ is the maximum load that scratches are not generated, as measured in the same manner as a method of measuring $S_0$ as to the film prepared by immersing the low refractive layer for 2 minutes in 10 wt % sodium hydroxide aqueous solution heated to 30° C., washing the immersed layer with water, wiping moisture off, followed by immersing the wiped layer for 30 seconds in 10 wt % sodium hydroxide aqueous solution heated to 55° C., and then washing it with water and wiping moisture off.

The unit of the load in the formula 2 is $g/(2*2 \text{ cm}^2)$, which means weight (g) per area ($2*2 \text{ cm}^2$) having a width of 2 cm and a length of 2 cm.

In the formula 2, $S_0$ is a value that can evaluate an initial scratch resistance of the low refractive layer, and $S_1$ is a value that can evaluate a scratch resistance of the alkali-treated low refractive layer. In this case, the alkali treatment conditions are the same in the formula 1, and the scratch resistance of the low refractive layer before and after the alkali treatment can be evaluated as described in the formula 2. For details related to the evaluation method of the scratch resistance refer to Experimental Examples described which will be described below.

Because the low refractive layer according to one embodiment of the invention exhibits excellent alkali resistance as described above, the change rate (ΔS) in the scratch resistance before and after alkali treatments according to the formula 2 may be 30% or less, 25% or less, 20% or less, or 15% or less. Also, the low refractive layer can exhibit a scratch resistance which does not change even after alkali treatment at high temperature, and thus ΔS in the formula 2 may be 0%.

On the other hand, the low refractive layer has excellent mechanical properties such as a scratch resistance as described above. As an example, the scratch resistance before alkali treatment of the low refractive layer ($S_0$ value in the formula 2) may be about 250 to 800 $g/(2*2 \text{ cm}^2)$ or about 300 to 800 $g/(2*2 \text{ cm}^2)$. Additionally, the low refractive layer can exhibit excellent scratch resistance even after alkali treatment, due to its excellent alkali resistance. As an example, the scratch resistance after alkali resistance of the low refractive layer ($S_1$ value in the formula 2) may be about 200 to 800 $g/(2*2 \text{ cm}^2)$ or about 230 to 800 $g/(2*2 \text{ cm}^2)$.

The low refractive layer according to an embodiment of the invention may exhibit a minimum reflectance in the visible light region together with excellent optical and mechanical properties described above. More specifically, the low refractive layer can exhibit a minimum reflectance in the wavelength range of about 480 to 680 nm or in the wavelength range of about 500 to 580 nm, thereby effectively preventing a glaring phenomenon of the display device.

Further, the low refractive layer according to an embodiment of the invention can exhibit a very low reflectance in the visible light region. More specifically, for the low refractive layer, an average reflectance for light in the wavelength range of 380 to 780 nm may be horn 0.9 to 2.5%, from 0.9 to 2.2%, from 0.9% to 2.0%, from 0.9 to 1.5%, or from 1 to 1.3%. Accordingly, the low refractive layer can, when introduced into the display device, prevent the glaring phenomenon caused by light made incident from the outside.

The average reflectance and the color coordinate value of the low refractive layer can be measured using a spectrophotometer. Specifically, the reflectance and the color coordinate value can be measured by setting the following measurement conditions at room temperature: sampling interval 1 nm (preferably 2 nm or less, but also adjustable to 5 nm), time constant 0.1 sec, slit width 20 nm, and medium scanning speed; darkening the opposite surface to the surface for irradiating light among the both surfaces of the low refractive layer so as to prevent transmission of light; and then irradiating the light in the wavelength range of 380 nm to 780 nm. At this time, if the low refractive layer is formed on a substrate film; or on a hard coating layer formed on the substrate film as described below, the surface not formed of a low refractive layer or a hard coating layer of the substrate film can be darkened so as to prevent transmission of light. As an example, the darkening may be carried out by attaching a black tape to the film surface.

In addition, if the low refractive layer has a flat surface without irregularities, a light is irradiated at an incident angle of 5° to measure the light reflected at a reflection angle of 5°. Thus, on the basis of the measured value of the standard sample substance ($BaSO_4$ and 95% Al mirror, available from Shimadzu), the reflectance according to the wavelength of the low refractive layer is measured (measure mode). Then, the average reflectance and color coordinate value can be derived from said reflectance through a UV-2401PC color analysis program.

On the other hand, if the low refractive layer has a surface with irregularities, a light is made incident perpendicularly to the low refractive layer to thereby measure the light that is scattered and reflected in all directions. Thus, on the basis of the measured value of the standard sample material ($BaSO_4$, available from Shimadzu), the reflectance according to the wavelength of the low refractive layer is measured (100% T mode). Then, the average reflectance and color coordinate values can be derived from said reflectance through a UV-2401PC color analysis program.

The low refractive layer of one embodiment of the invention that can exhibit excellent optical and mechanical properties as described above may include a photo-cured product obtained by photo-curing a photocurable coating composition comprising a photopolymerizable compound, a polysilsesquioxane substituted with at least one reactive functional group, a fluorine-based compound containing $O—CF_2CF_2—O—CF_3$, an inorganic particle and a photopolymerization initiator.

The photopolymerizable compound used herein collectively refers to a compound that causes a polymerization reaction when irradiated with a light, for example when irradiated with visible light or ultraviolet light.

The photocurable coating composition may include, as a photopolymerizable compound, a monomer or oligomer containing a (meth)acryloyl group or a vinyl group. The monomer or oligomer may include one or more, two or more, or three or more (meth)acryloyl groups or vinyl groups. The (meth)acryl is used herein to include both acryl and methacryl.

Specific examples of the monomer or oligomer containing a (meth)acryloyl group may include pentaerythritol tri(meth)acrylate, pentaerythritol tetra(meth)acrylate, dipentaerythritol penta(meth)acrylate, dipentaerythritol hexa(meth)acrylate, tripentaerythritol hepta(meth)acrylate, trimethylolpropane tri(meth)acrylate, trimethylolpropane polyethoxy tri(meth)acrylate, ethyleneglycol di(meth)acrylate, butanediol di(meth)acrylate, ethylhexyl (meth)acrylate, butyl (meth)acrylate or mixtures of two or more thereof, or urethane modified acrylate oligomer, epoxide acrylate oligomer, ether acrylate oligomer, dendritic acrylate oligomer or mixtures of two or more thereof.

Specific examples of the monomer or oligomer containing a vinyl group may include an oligomer or the like obtained by polymerizing divinylbenzene, styrene, para-methyl styrene or one or more thereof. The molecular weight of the oligomer used herein can be adjusted to 1,000 to 10,000 g/mol.

The content of the photopolymerizable compound in the photocurable coating composition may be adjusted to from 20% to 80% by weight, from 30% to 70% by weight or from 30% to 65% by weight based on the solid content of the photo-curable coating composition, in consideration of the mechanical properties of the low refractive layer to be finally prepared.

The solid content of the photocurable coating composition refers to only a solid component in the photocurable coating composition, excluding a liquid component, for example, a component such as an organic solvent that can be optionally included as described below.

The photocurable coating composition can include one or more reactive functional groups-substituted polysilsesquioxane, thereby implementing a low reflectance and a high light transmittance without coloration, and providing the low refractive layer that can improve the alkali resistance and at the same time ensure the scratch resistance.

The one or more reactive functional groups-substituted polysilsesquioxane can be included in an amount of 0.5 to 25 parts by weight, 1 to 20 parts by weight, 1.5 to 19 parts by weight or 2 to 15 parts by weight based on 100 parts by weight of the photopolymerizable compound. Also, the content of the one or more reactive functional groups-substituted polysilsesquioxane in the photocurable coating composition can be adjusted to from 1% to 25% by weight, from 1% to 20% by weight, from 1% to 15% by weight, or from 1% to 10% by weight based on the solid content of the photo-curable coating composition.

If the content of the one or more reactive functional groups-substituted polysilsesquioxane is less than the above-described range, it may be difficult to sufficiently ensure the alkali resistance or scratch resistance of the coating film or the polymer resin which is formed during a photo-curing process of the photocurable coating composition. Meanwhile, if the content of the one or more reactive functional groups-substituted polysilsesquioxane exceeds the above-described range, the transparency of the low refractive layer prepared from the photocurable coating composition may be lowered and the scratch resistance can be rather reduced.

The reactive functional group which can be substituted in the polysilsesquioxane may include one or more functional groups selected from the group consisting of alcohol, amine, carboxylic acid, epoxide, imide, (meth)acrylate, nitrile, norbornene, olefin (allyl cycloalkenyl or vinyl dimethyl silyl, etc.], polyethylene glycol thiol and vinyl groups. Preferably, it may include epoxide or (meth)acrylate.

More specifically, when the reactive functional group is an epoxide, 2-[3,4-epoxycyclohexyl]ethyl group or 3-glycidoxypropyl group or the like can be introduced as the reactive functional group. When the reactive functional group is (meth)acrylate, (meth)acryloyloxy alkyl group (wherein the alkyl group may have 1 to 6 carbon atoms) or the like can be introduced as the reactive functional group.

Even if polysilsesquioxane includes the same functional group as a photopolymerizable compound as a reactive functional group, polysilsesquioxane with a siloxane bond (—Si—O—) as skeleton is defined as not including in the photopolymerizable compound.

On the other hand, the one or more reactive functional groups-substituted polysilsesquioxanes may be further substituted with one or more non-reactive functional groups selected from the group consisting of a straight chain or branched alkyl group having 1 to 30 carbon atoms, a cycloalkyl group having 6 to 30 carbon atoms and an aryl group having 6 to 30 carbon atoms, in addition to the above-described reactive functional group. In this way, as the surface of the polysilsesquioxane is substituted by a reactive functional group and a non-reactive functional group, a siloxane bond (—Si—O—) in the one or more reactive functional groups-substituted polysilsesquioxane is located within the molecule and thus not exposed to the outside, thereby further improving the alkali resistance of a coating film or a polymer resin formed during the photo-curing process of the photocurable coating composition. In particular, when the non-reactive functional group, which is introduced together with a reactive functional group in the polysilsesquioxane, is a straight chain or branched alkyl group having 6 or more carbon atoms; a straight chain or branched alkyl group having 6 to 30 carbon atoms; or a cycloalkyl group having 6 to 30 carbon atoms, the alkali resistance of the low refractive layer can be further improved.

The polysilsesquioxane can be represented by $(RSiO_{1.5})_n$ (wherein n is from 4 to 30 or from 8 to 20, each R is independently a reactive functional group; or a non-reactive functional group selected from the group consisting of a straight chain or branched alkyl group having 1 to 30 carbon atoms, a cycloalkyl group having 6 to 30 carbon atoms and an aryl group having 6 to 30 carbon atoms), and may have various structures such as random, ladder, cage and partial cage types.

Among them, in order to further improve the above-described characteristics, as the polysilsesquioxane substituted by one or more reactive functional groups, polyhedral oligomeric silsesquioxane substituted by one or more reactive functional groups and having a cage structure can be used.

More specifically, the polyhedral oligomeric silsesquioxane may include 8 to 20 silicones in the molecular.

Examples of the polyhedral oligomeric silsesquioxane (POSS) substituted by one or more reactive functional groups and having a cage structure may include one or more alcohols-substituted POSS such as IMP DiolIsobutyl POSS, Cyclohexanediol Isobutyl POSS, 1,2-PropanediolIsobutyl POSS, Octa(3-hydroxy-3 methylbutyldimethylsiloxy) POSS; one or more amines-substituted POSS such as AminopropylIsobutyl POSS, AminopropylIsooctyl POSS, Aminoethylaminopropyl Isobutyl POSS, N-Phenylaminopropyl POSS, N-Methylaminopropyl Isobutyl POSS, OctaAmmonium POSS, AminophenylCyclohexyl POSS, AminophenylIsobutyl POSS; one or more carboxylic acids-substituted POSS such as Maleamic Acid-Cyclohexyl POSS, Maleamic Acid-Isobutyl POSS, Octa Maleamic Acid POSS; one or more epoxides-substituted POSS such as EpoxyCyclohexylIsobutyl POSS, Epoxycyclohexyl POSS, Glycidyl POSS, GlycidylEthyl POSS, GlycidylIsobutyl POSS, GlycidylIsooctyl POSS; one or more amides-substituted POSS such as POSS Maleimide Cyclohexyl, POSS Maleimide Isobutyl; one or more (meth)acrylates-substituted POSS such as AcrytoIsobutyl POSS, (Meth)acrylIsobutyl POSS, (Meth)acrylate Cyclohexyl POSS, (Meth)acrylate Isobutyl POSS, (Meth)acrylate Ethyl POSS, (Meth)acrylEthyl POSS, (Meth)acrylate Isooctyl POSS, (Meth)acrylIsooctyl POSS, (Meth)acrylPhenyl POSS, (Meth)acryl POSS, Acrylo POSS; one or more nitrile groups-substituted such as CyanopropylIsobutyl POSS; one or more norbornene groups-substituted POSS such as NorbornenylethylEthyl POSS, NorbornenylethylIsobutyl POSS, Norbornenylethyl DiSilanoIsobutyl POSS, Trisnorbornenyl Isobutyl POSS; one or more vinyl groups-substituted POSS such as AllylIsobutyl POSS, MonoVinylIsobutyl POSS, OctaCyclohexenyldimethylsilyl POSS, OctaVinyldimethylsilyl POSS, OctaVinyl POSS; one or more olefins-substituted POSS such as AllylIsobutyl POSS, MonoVinylIsobutyl POSS, OctaCyclohexenyldimethylsilyl POSS, OctaVinyldimethylsilyl POSS, OctaVinyl POSS; POSS substituted with PEG group having 5 to 30 carbon atoms; one or more thiol groups-substituted POSS such as MercaptopropylIsobutyl POSS or MercaptopropylIsooctyl POSS; or the like.

Further, a reactive functional group can be introduced in at least one or more of silicones of the polyhedral oligomeric silsesquioxane, and silicones having no introduced reactive functional group may be substituted with the above-described non-reactive functional group.

When a reactive functional group is introduced in at least one or more of silicones of the polyhedral oligomeric silsesquioxane, it is possible to greatly improve the mechanical properties of a coating film or a polymer resin formed during the photo-curing process of the photocurable coating composition. And, when a non-reactive functional group is introduced to the remaining silicones, a molecular structurally steric hindrance appears and thereby the possibility of the exposure of a siloxane bond (—Si—O—) to the outside can be greatly reduced. Thus, it is possible to greatly improve the alkali resistance of a coating film or a polymer resin formed during the photo-curing of the photocurable coating composition.

More specifically, when the polysilsesquioxane is substituted with both a reactive functional group and a non-reactive functional group, the molar ratio of as a reactive functional group to a non-reactive functional group substituted in the polysilsesquioxane (mole number of the reactive functional group/mole number of the non-reactive functional group) may be 0.20 or more, or 0.30 or more, and it may be from 0.20 to 6.00, from 0.30 to 4.00, or from 0.40 to 3.00.

When the ratio between a reactive functional group and a non-reactive functional group substituted in the polysilsesquioxane is within the above range, the steric hindrance in the molecule of the polysilsesquioxane can be maximized, whereby the possibility that a siloxane bond (—Si—O—) is exposed to the outside is significantly reduced, thereby greatly improving the mechanical properties or alkali resistance of a coating film or a polymer resin formed during the photo-curing of the photo-curable coating composition.

The photocurable coating composition comprises a fluorine-based compound containing —O—$CF_2CF_2$—O—$CF_3$.

As used herein, the fluorine-based compound refers to a compound having a weight average molecular weight of at least 2,000 g/mol and substituted with a fluorine. Such a compound is defined as not including in the definition of the above-described photopolymerizable compounds.

In particular, the fluorine-based compound contains —O—$CF_2CF_2$—O—$CF_2$, and thus the low refractive layer prepared from the photocurable coating composition may have lower reflectance and improved light transmittance and also it may have a more improved alkali resistance and scratch resistance.

The fluorine-based compound contains —O—$(CF_2)_n$—C)— (wherein n is an integer of 1 to 3) and —O—$CF_2CF_2CF_2$ together with —O—$CF_2CF_2$—O—$CF_3$, thereby more improving the above-described physical properties.

The fluorine-based compound introduces one or more photoreactive functional groups, and the photoreactive functional group refers to a functional group that can participate in a polymerization reaction by irradiation with light, for example, by irradiation with visible light or ultraviolet light. The photoreactive functional group may include various functional groups known to be able to participate in the polymerization reaction by light irradiation, and specific examples thereof may include (meth)acryloyl group, epoxy group, vinyl group or mercapto group, and the like.

The fluorine-based compound may have a fluorine content of 1% to 25% by weight. If the content of fluorine in the fluorine-based compound is less than the above range, the fluorine component is not sufficiently arranged on the surface of the final product obtained from the photocurable coating composition, and thus it may be difficult to sufficiently secure the physical properties such as alkali resistance. If the content of fluorine in the fluorine-based compound exceeds the above range, the surface properties of the final product obtained from the photocurable coating composition is lowered or the incidence of defective products during subsequent process for obtaining the final products can be increased.

The fluorine-based compound may further include a silicone; or a side chain or a repeating unit derived from the silicone compound. When the fluorine-based compound includes a silicone, or a side chain or a repeating unit derived from the silicone compound, the content of silicone may be from 0.1% to 20% by weight relative to the fluorine-based compound. The silicone contained in the fluorine-based compound serves to prevent the occurrence of haze on the low refractive layer obtained from the photocurable coating composition of the embodiment of the invention, thus increasing the transparency. On the other hand, when the content of silicon in the fluorine-based compound exceeds the above range, the alkali resistance of the low refractive layer obtained from the photocurable coating composition can be lowered.

The fluorine-based compound may have a weight average molecular weight of 2,000 to 200,000 g/mol. If the weight average molecular weight of the fluorine-based compound is too small, the low refractive layer obtained from the photocurable coating composition may not have sufficient alkali resistance. In addition, when the weight average molecular weight of the fluorine-based compound is too large, the low refractive layer obtained from the photocurable coating composition may not have sufficient durability and scratch resistance. The weight average molecular weight as used herein refers to a converted value with respect to a standard polystyrene as measured by GPC (Gel Permeation Chromatograph).

Specifically, the fluorine-based compound may include i) an aliphatic compound or an alicyclic confound substituted by one or more photoreactive functional groups, in which at least one hydrogen is replaced by fluorine; ii) a silicon-based compound in which one or more carbons of the aliphatic compound or the alicyclic compound are substituted by silicone; iii) a siloxane-based compound in which one or more carbons of the aliphatic compound or the alicyclic compound are substituted by silicone and one or more —$CH_2$— is substituted by oxygen; iv) fluoropolyether in which one or more —$CH_2$— of the aliphatic compound or the alicyclic compound is substituted by oxygen; or a mixture or a copolymer of two or more of these compounds.

For the low refractive layer to exhibit an alkali resistance at high temperature to such an extent that the above formula 1 is satisfied, a sufficient quantity of fluorine should be distributed on the surface of the low refractive layer so that an alkali solution is not penetrated or absorbed into the low refractive layer. Even if an alkali solution is penetrated or absorbed into the low refractive layer, the crosslinking density should be high so as to withstand such an alkali solution.

A cured product of the fluorine-based compound is distributed on the surface of the low refractive layer of the present invention and thus, even if treated with an alkali it is possible to prevent an alkali solution from penetrating or absorbing into the low refractive layer. However, the fluorine-based compound has a larger molecular weight as compared with the photopolymerizable compound described above and has a lower amount of photoreactive functional groups relative to the same volume or weight. Thus, when the content of the photopolymerizable compound reduces and the content of the fluorine-based compound increases, there is a tendency that the crosslinking density of the low refractive layer is lowered.

Therefore, when a cured product of the fluorine-based compound is presented in an excessive amount from the surface to the inside of the low refractive layer, the crosslinking density of the low refractive layer is lowered and thus it is difficult to exhibit excellent alkali resistance.

For the low refractive layer to exhibit an alkali resistance at a high temperature to such an extent that the above formula 1 is satisfied, the cured product of the fluorine-based compound should be mostly presented on the surface of the low refractive layer. For the cured product of the fluorine-based compound to mostly present on the surface of the low refractive layer, it is important to adjust the content of the fluorine-based compound in the photocurable coating composition.

Specifically, the photocurable coating composition may include 1 to 75 parts by weight, 1 to 50 parts by weight, 1 to 30 parts by weight, 1 to 20 parts by weight or 1 to 15 parts by weight of a fluorine-based compound, based on 100 parts by weight of the photopolymerizable compound. In addition, the content of the fluorine-based compound in the photocurable coating composition can be adjusted from 0.5% to 50% by weight, from 0.5% to 30% by weight, from 0.5% to 20% by weight or from 1% to 15% by weight relative to the solid content of the photocurable coating composition.

When the fluorine-based compound is in an excessive amount relative to the pbotopolymerizable compound, the coating property of the photocurable coating composition is decreased or the crosslinking density of the low refractive layer obtained from the photocurable coating composition is decreased, and thus it is not possible to exhibit sufficient alkali resistance, durability, scratch resistance or the like. In addition, when the amount of the fluorine-based compound is too small relative to the photopolymerizable compound, a sufficient amount of fluorine is not distributed on the surface of the low refractive layer obtained from the photocurable coating composition and thus the low refractive layer may not have sufficient alkali resistance.

On the other hand, the photocurable coating composition includes inorganic particles having a diameter in the nanometer or micrometer units.

Specifically, the inorganic particle may be a hollow silica particle having a number average particle diameter of 10 to 100 nm. And the hollow silica particle is a silica particle that is derived from the silicon compound or an organic silicon compound and refers to a silica particle in which a free space is present in the surface and/or the inside of the particle. The hollow silica particle has a lower refractive index as compared with a non-hollow particle, thus exhibiting excellent antireflection properties.

The inorganic particle may have a number average particle diameter of 10 to 100 nm, 20 to 70 nm, or 30 to 70 nm, and the shape of the particle is preferably spherical, but it may be amorphous.

Further, as the inorganic particle, a particle that is surface-coated with a fluorine-based compound can be used atone, or it can be used in combination of the inorganic particle that is not surface-coated with a fluorine-based compound. When the surface of the inorganic particle is coated with a fluorine-based compound, it can more reduce the surface energy and thus, the inorganic particle can be more uniformly distributed in the photocurable coating composition. Accordingly, the film obtained from the photocurable coating composition comprising such inorganic particle can exhibit more improved durability and scratch resistance.

As the method for coating a fluorine-based compound to the surface of the inorganic particle, a particle coating method or a polymerization method or the like which are generally known can be used without any particular limitation. As a non-limiting example, a method of reacting the inorganic particle and the fluorine-based compound in the presence of water and catalyst through a sol-gel process and then attaching the fluorine-based compound to the surface of the inorganic panicle through a hydrolysis and condensation reaction, and the like can be used.

Further, the inorganic particle may be included in the composition as a colloidal phase dispersed in a predetermined dispersion medium. The colloidal phase containing the inorganic particle may include an organic solvent as a dispersion medium.

In the colloidal phase of the inorganic particle, the amount of the solid content of the inorganic particle may be determined in consideration of the content range of the inorganic particles in the photocurable coating composition or the viscosity of the photocurable coating composition or the like. As an example, the amount of the solid content of the inorganic particle in the colloidal phase may be 5% to 60% by weight.

Here, as the organic solvent in the dispersion medium, alcohols such as methanol, isopropyl alcohol, ethylene glycol, butanol; ketones such as methyl ethyl ketone, methyl isobutyl ketone; aromatic hydrocarbons such as toluene, xylene; amides such as dimethylformamide, dimethylacetamide, N-methylpyrrolidone; esters such as ethyl acetate, butyl acetate, gamma-butyrolactone; ethers such as tetrahydrofuran, 1,4-dioxane; or a mixture thereof may be used.

The photocurable coating composition may include the inorganic particle in an amount of 10 to 320 pans by weight, 20 to 200 parts by weight or 30 to 200 ports by weight based on 100 parts by weight of the photopolymerizable compound. In addition, the content of the inorganic particle in the photocurable coating composition can be adjusted to 10% to 80% by weight, 20% to 70% by weight or 20% to 60% by weight relative to the solid content of the photocurable coating composition.

If the inorganic particle is excessively added, a scratch resistance or a wear resistance of the coating film may be lowered due to a decrease in the content of the polymer resin.

As the photopolymerization initiator, any compound can be used without particular limitation as long as it is known that the compound is generally used in the photocurable coating composition. Specifically, benzophenone-based compounds, acetophenone-based compounds, non-imidazole-based compounds, triazine-based compounds, oxime-based compound, or mixtures of two or more of these compounds can be used.

The photopolymerization initiator can be used in an amount of 1 to 100 pons by weight, 1 to 50 parts by weight or 1 to 20 parts by weight based on 100 parts by weight of the photopolymerizable compound. Further, the content of the photopolymerization initiator in the photocurable coating composition can be adjusted to 0.1% to 15% by weight, 1% to 10% by weight or 3% to 7% by weight relative to the solid content in the photocurable coating composition.

When the amount of the photopolymerization initiator is too small, it can cause uncured coating during the photo-curing step of the photocurable coating composition, thereby occurring a residual material. When the amount of the photopolymerization initiator is too large, the unreacted initiator remains as impurities or the crosslinking density is lowered, and thus the mechanical properties of the produced film may decrease or the reflectance may increase greatly.

On the other hand, the photocurable coating composition can further comprise an organic solvent. Non-limiting examples of the organic solvent may include ketones, alcohols, acetates and ethers, or mixtures of two or more thereof. Specific examples of such organic solvent may include ketones such as methyl ethyl ketone, methyl isobutyl ketone, acetyl acetone or isobutyl ketone; alcohols such as methanol, ethanol n-propanol, iso-propanol, n-butanol, iso-butanol, or t-butanol; acetates such as ethyl acetate, iso-propyl acetate, or polyethylene glycol monomethyl ether acetate; ethers such as tetrahydrofuran or propylene glycol monomethyl ether, or mixtures of two or more thereof.

The organic solvent is added at a time point when mixing the respective components contained in the photocurable coating composition or it can be contained in the photocurable coating composition while the respective components are added in a dispersed or mixed state. When the content of the organic solvent in the photocurable coating composition is too small, the flowability of the photocurable coating composition is decreased and thus defects may occur, for example, a stripe pattern is generated in the film finally produced. Further, when the organic solvent is excessively added, the amount of the solid content is lowered and coating and film formation are not sufficient. Thus, the physical properties or surface properties of the film can be lowered and further, defects can occur in the drying and curing process. Accordingly, the photocurable coating composition may include an organic solvent so that the entire solid content concentration of the components contained becomes 1 to 50% by weight or 2 to 20% by weight.

The photocurable coating composition is coated and photo-cured according to the method known in the technical field to which the invention pertains, thereby providing the above-mentioned low refractive layer.

First, the photocurable coating composition can be coated on a predetermined substrate. At this time, specific types or thickness of the substrate are not particularly limited, and the substrate known to be used in the preparation of the low refractive layer can be used without any particular limitation.

The photocurable coating composition can be coated using the method and apparatus known in the technical field to which the invention pertains. For example, the photocurable coating composition can be coated through a bar coating method such as Meyer bar, a gravure coating method, a 2 roll reverse coating method, a vacuum slot the coating method or 2 roll coating method.

The low refractive layer may have a thickness of 1 nm to 300 nm or 50 nm to 200 nm. Accordingly, the thickness of the photocurable coating composition to be coated onto a predetermined substrate may be adjusted to about 1 nm to 300 nm, or 50 nm to 200 nm.

After coating onto a photocurable coating composition as described above, the photocurable coating composition can be photo-cured by irradiation with ultraviolet light or visible light in the wavelength range of 200 to 400 nm. At this time, the exposure amount of light to be irradiated can be adjusted in the range of 100 to 4,000 mJ/cm$^2$, and the exposure time may be appropriately adjusted depending on the exposure apparatus, the wavelength or the exposure amount of the irradiation light to be used.

The photo-curing step can be carried out under a nitrogen atmosphere. Accordingly, nitrogen purging can be further carried out before the photo-curing step or during the photo-curing step.

The low refractive layer prepared from a photocurable coating composition as described above may include a polymer resin containing a cross-linked polymer between a photopolymerizable compound, a polysilsesquioxane substituted with at least one or more reactive functional groups, a fluorine-based compound containing O—CF$_2$CF$_2$—O—CF$_3$, and an inorganic particle disposed in the polymer resin.

However, the low refractive layer of the present invention is not intended to be formed only by the above-described components and compositions, and if the above formula 1 is satisfied, the low refractive layer can be formed by various components and compositions with reference to the above-described contents.

On the other hand, according to another embodiment of the invention, an anti-reflective film comprising a low refractive layer, and a hard coating layer formed on one surface of the low refractive layer is provided. The low refractive layer is described in detail previously, and so detailed description thereof will be omitted for simplicity.

As the above hard coating layer, a commonly known hard coating layer can be employed without particular limitation.

As an example, the hard coating layer may include a binder resin containing a photocurable resin and a (co)polymer with the weight average molecular weight of 10,000 g/mol or more (hereinafter, referred to as a high molecular weight (co)polymer); and an organic or inorganic fine particle dispersed in the binder resin. Herein, the (co)polymer is meant to include both co-polymer and homo-polymer.

The high molecular weight (co)polymer may comprise one or more polymers selected from the group consisting of cellulosic polymers, acrylic polymers, styrenic polymers, epoxide-based polymer, nylon-based polymer, polyurethane-based polymer and polyolefin-based polymer.

The photocurable resin contained in the hard coating layer is a polymer of the photopolymerizable compound that can cause a polymerization reaction when irradiated with light such as ultraviolet light, and those that are conventionally used in the art to which the invention belongs may be used. Specifically, the photopolymerizable compound may include one or more selected a reactive acrylate oligomer group consisting of urethane acrylate oligomer, epoxide acrylate oligomer, polyester acrylate, and polyether acrylate; and a polyfunctional acrylate monomer group consisting of dipentaerythritol hexaacrylate, dipentaerythritol pentaacrylate, pentaerythritol tetraacrylate, pentaerythritol triacrylate, trimethylolpropane triacrylate, glycerol propoxylate triacrylate, trimethylpropane ethoxylate triacrylate, 1,6-hexanediol diacrylate, tripropylene glycol diacrylate and ethylene glycol diacrylate.

The organic or inorganic fine particles may have a particle diameter of 1 to 10 μm.

The organic or inorganic fine particles are organic fine particles selected from the group consisting of acrylic resin, styrene-based resin, epoxy-based resin, and nylon-based resin or inorganic fine particles selected from the group consisting of silicon oxide, titanium dioxide, indium oxide, tin oxide, zirconium oxide and zinc oxide.

The hard coating layer can be formed from a coating composition comprising an organic or inorganic fine particle, a photopolymerizable compound, a photo-initiator and a high molecular weight (co)polymer. The anti-reflective film comprising such a hard coating layer has excellent anti-glare effect.

On the other hand, as another example of the hard coating layer, a hard coating layer comprising a binder resin containing a photocurable resin; and an antistatic agent dispersed in the binder resin can be mentioned.

The photocurable resin contained in the hard coating layer is a polymer of a photopolymerizable compound that can cause a polymerization reaction when irradiated with light such as ultraviolet light, and those that are conventionally used in the art to which the invention belongs may be used. Specifically, the photopolymerizable compound that may be used herein includes a polyfunctional (meth)acrylate-based monomer or oligomer, wherein the number of the (meth)acrylate-based functional groups can be adjusted to 2 to 10, 2 to 8 or 2 to 7, thereby ensuring the desired physical properties of the hard coating layer. More specifically, the photopolymerizable compound can include one or more selected from the group consisting of pentaerythritol tri (meth)acrylate, pentaerythritol tetra(meth)acrylate, dipentaerythritol penta(meth)acrylate, dipentaerythritol hexa(meth)acrylate, tripentaerythritol hepta(meth)acrylate, toluene diisocyanate, xylene diisocyanate, hexamethylene diisocyanate, trimethylolpropane tri(meth)acrylate, and trimethylolpropane polyethoxy tri(meth)acrylate.

The antistatic agent may be a quaternary ammonium salt compound, a conductive polymer, or a mixture thereof. Hoe, the quaternary ammonium salt compound may be a compound having at least one quaternary ammonium salt in a molecule, and a low molecular type or a polymer type can be used without limitation. Thus, as the conductive polymer, a low molecular type or a polymer type can be used without limitation, and the type thereof may be conventional in the technical field to which the invention pertains, and thus it is not particularly limited.

The hard coating layer comprising a binder resin of the photocurable resin; and an antistatic agent dispersed in the binder resin can further include one or more compounds selected from the group consisting of an alkoxysilane-based oligomer and a metal alkoxide-based oligomer.

The alkoxy silane-based compound may be conventional in the art, but preferably, it may be one or more compounds selected from the group consisting of tetramethoxysilane, tetraethoxysilane, tetraisopropoxysilane, methyltrimethoxysilane, methyltriethoxysilane, methacryloxypropyltrimethoxysilane, glycidoxypropyltrimethoxysilane, and glycidoxypropyltriethoxysilane.

In addition, the metal alkoxide-based oligomer can be prepared through the sol-gel reaction of the composition containing metal alkoxide-based compound and water. The sol-gel reaction can be carried out by a method similar to the method for preparing alkoxysilane-based oligomer as described above.

However, the metal alkoxide-based compounds can be rapidly reacted with water, and thus the sol-gel reaction can be carried out by diluting the metal alkoxide-based compound in an organic solvent and then slowly adding dropwise water thereto. At this time, in view of the reaction efficiency, etc., the molar ratio of metal alkoxide compound to water (based on metal ion) is preferably adjusted in the range of 3 to 170.

Here, the metal alkoxide-based compound may be one or more compounds selected firm the group consisting of titanium tetra-isopropoxide, zirconium isopropoxide and aluminum isopropoxide. On the other hand, the anti-reflective film may further include a substrate bonded to the other surface of the hard coating layer. The substrate may be a transparent film having a light having a light transmittance of 90% or more and a haze value of 1% or less. Further, the material of the substrate may be triacetyl cellulose, cycloolefin polymer, polyacrylate, polycarbonate, polyethylene terephthalate or the like. In addition, the thickness of the substrate film may be 10 to 300 μm in consideration of productivity or the like. However, it is not intended to limit the present invention thereto.

ADVANTAGEOUS EFFECTS

The low refractive layer according to an embodiment of the invention can exhibit excellent optical properties such as a low reflectance and a high light transmittance, and excellent mechanical properties such as high wear resistance and scratch resistance at the same time, without adversely affecting the color of the polymer resin. In particular, due to the excellent alkali resistance, the low refractive layer can exhibit the excellent physical properties even after alkali treatment. Therefore, when introducing a low refractive layer to the display device, it is expected that the production process can be simplified and further the production rate and the productivity can significantly increase.

BRIEF DESCRIPTION OF DRAWINGS

FIG. 1 is a graph showing the reflectance according to the wavelength of the anti-reflective film prepared in Example 1.

FIG. 2 is a graph showing the reflectance according to the wavelength of the anti-reflective film prepared in Example 2.

FIG. 3 is a graph showing the reflectance according to the wavelength of the anti-reflective film prepared in Example 3.

FIG. 4 is a graph showing the reflectance according to the wavelength of the anti-reflective film prepared in Comparative Example 1.

FIG. 5 is a graph showing the reflectance according to the wavelength of the anti-reflective film prepared in Comparative Example 2.

FIG. 6 is a graph showing the reflectance according to the wavelength of the anti-reflective film prepared in Comparative Example 3.

FIG. 7 is a graph showing the reflectance according to the wavelength of the anti-reflective film prepared in Comparative Example 4.

FIG. 8 is a graph showing the reflectance according to the wavelength of the anti-reflective film prepared in Comparative Example 5.

DETAILED DESCRIPTION OF THE EMBODIMENTS

Hereinafter, the action and effect of the invention will be described in detail, through specific examples of the invention. However, the examples are provided only to illustrate the present invention, and the scope of the invention is not limited thereto.

Preparation Example

Preparation Example 1: Preparation of Hard Coating Film 1 (HD1)

A salt type of antistatic hard coating solution (manufactured by KYOEISHA Chemical Co., Ltd., solid content: 50 wt %, product name: LID-1000) was coated onto triacetylcellulose film with #10 mayer bar and dried at 90° C. for one minute, followed by irradiation with ultraviolet light of 150 mJ/cm$^2$ to prepare a hard coating film (HD1) having a thickness of 5 μm.

Preparation Example 2: Preparation of Hard Coating Film 2 (HD2)

30 g of pentaerythritol triacrylate, 2.5 g of high molecular weight copolymer (BEAMSET 371, Arakawa Corporation, Epoxy Acrylate, molecular weight: 40,000), 20 g of methyl ethyl ketone and 0.5 g of leveling agent (Tego wet 270) were uniformly mixed. Then, 2 g of acrylic-styrene copolymer (volume average particle size: 2 μm, manufactured by Sekisui Plastic) with a refractive index of 1.525 as a fine particle was added to the mixture to prepare a hand coating composition. The hand coating composition thus obtained was coated onto triacetylcellulose film with a #10 mayer bar and dried at 90° C. for one minute. The dried product was irradiated with ultraviolet light of 150 mJ/cm$^2$ to prepare a hand coating film (HD2) having a thickness of 5 μm.

Preparation Example 3: Preparation of Polysilsesquioxane 1

36.57 g (0.156 mol) of isooctyltrimethoxy silane, 23.34 g (0.094 mol) of 3-methacryloxypropyl trimethoxysilane and 500 mL of methanol were added to a 1 L reactor equipped with a nitrogen gas inlet tube, a condenser and a stirrer, and stirred at room temperature for 10 minutes. Then, tetramethylammonium hydroxide (280 g, 0.77 mol, 25 wt % in methanol) was added thereto, and the reaction was carried out for 8 hours by raising the reactor temperature under a nitrogen atmosphere to 60° C. After completion of the reaction, 15 g of polyhedral oligomeric silsesquioxane (POSS) substituted by an isooctyl group and a methacryloxypropyl group was obtained through column chromatography and recrystallization. The confirmation result of GP Chromatography showed that the molar ratio of a methacryloxypropyl group to an isooctyl group (mole number of methacryloxypropyl group/mole number of isooctyl group) which is substituted at silicon of polysilsesquioxane is about 0.6 to 1.67.

Preparation Example 4: Preparation of Fluorine-Based Compound 2

After sufficiently replacing with nitrogen gas, a 2.0 L stainless steel autoclave equipped with an electronic stirrer was charged with 400 g of ethyl acetate, 53.2 g of perfluoro (propyl vinyl ether), 36.1 g of ethyl vinyl ether, 44.0 g of hydroxyethyl vinyl ether, 1.00 g of lauroyl peroxide, 6.0 g of an azo group-containing polydimethylsiloxane represented by the following formula 1 (VPS1001 (trade name), Wako Pure Chemical industries, Ltd.) and 20.0 g of nonionic reactive emulsifier (NE-30 (trade name), manufactured by Asahi Denka Co., Ltd.) and cooled to −50° C. in methanol dry-ice bath, and then oxygen within the system was again removed with nitrogen gas.

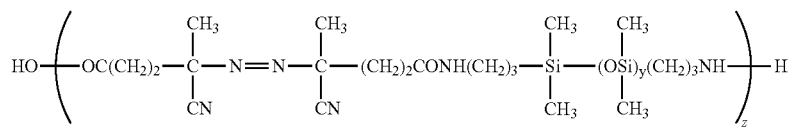

Then, 120.0 g of hexafluoropropylene was added thereto and the temperature stated to rise. The pressure at a time point when the temperature in the autoclave reached 60° C. exhibited $5.3 \times 10^5$ Pa. Thereafter, the reaction was continued while stirring at 70° C. for 20 hours, and the reaction was stopped by cooling the autoclave at a time point when the pressure was reduced to $1.7 \times 10^5$ Pa. After reaching the room temperature, the unreacted monomers were released, and the autoclave was opened to obtain a polymer solution with a solid content concentration of 26.4%. The resulting polymer solution was added to methanol to precipitate a polymer, and then washed with methanol and dried in vacuum at 50° C. to obtain 220 g of a hydroxyl group-containing fluoropolymer.

50.0 g of a hydroxyl group-containing fluoropolymer prepared previously, 0.01 g of 2,6-di-t-butylmethylphenol as a polymerization inhibitor and 370 g of methyl isobutyl ketone (MIBK) were added to a 1 L flask equipped with an electronic stirrer, a cooling tube made of glass and a thermometer, and then stirred until the hydroxyl group-containing fluoropolymer was dissolved in MIBK at 20° C. and the solution became transparent.

Then, 13.7 g of 2-acryloxyethyl isocyanate was added to the system and stirred until the solution became homogeneous. Thereafter, 0.1 g of dibutyltin dilaurate was added thereto and then stirred for 5 hours while maintaining the temperature in the system to 55 to 65° C. thereby obtaining a MIBK solution of the ethylenically unsaturated group-containing fluoropolymer (acrylic modified fluoropolymer). 2 g of this solution was weighed and dropped into an aluminum plate, dried for 5 minutes on a hot plate at 150° C. and re-weighed to calculate the amount of the solid content. As a result, the amount of the solid content was 15.0 wt %.

Examples and Comparative Example, Preparation of Anti-Reflective Film (1) Preparation of the Photocurable Coating Composition for the Production of a Low Refractive Layer The ingredients shown in Table 1 were mixed and diluted so that the solid content in MIBK (methyl isobutyl ketone) solvent became 3 wt %.

TABLE 1

| | LR1 | LR2 | LR3 | LR4 | LR5 | LR6 |
|---|---|---|---|---|---|---|
| Hollow silica dispersion[1] | 220 (44) | 130 (26) | 220 (44) | 130 (26) | 220 (44) | 40 (8) |
| Trimethylolpropane triacrylate | 41 (41) | 62 (62) | 47 (47) | 67 (67) | 41 (41) | 0 (0) |
| Polysilsesquioxane 1[2] | 6 (6) | 5 (5) | 0 (0) | 0 (0) | 0 (0) | 0 (0) |
| Polysilsesquioxane 2[3] | 0 (0) | 0 (0) | 0 (0) | 0 (0) | 6 (6) | 30 (30) |
| Fluorine-based compound 1[4] | 13.333 (4) | 6.667 (2) | 13.333 (4) | 6.667 (2) | 0 (0) | 0 (0) |
| Fluorine-based compound 2[5] | 0 (0) | 0 (0) | 0 (0) | 0 (0) | 26.667 (4) | 400 (60) |
| Photoinitiator (Irgacure-127, Ciba Specialty Chemicals Inc.) | 5 (5) | 5 (5) | 5 (5) | 5 (5) | 5 (5) | 2 (2) |

(Unit: g; the number in parentheses refers to the amount of the solid content)

[1] Hollow silica dispersion: THRULYA4320 in which hollow silica particles with a number average diameter of 50 nm were dispersed at 20 wt % in MIBK (manufactured by Catalysts & Chemicals Ind. Co., Ltd.)

[2] Polysilsesquioxane 1: Polysilsesquioxane 1 prepared according to Preparation Example 3

[3] Polysilsesquioxane 2: MAC-SQ-F (manufactured by TOAGOSEI CO., Ltd.)

[4] Fluorine-based compound 1: Fluorine-based compound containing a photoreactive functional group, —O—$CF_2CF_2$—O—$CF_3$, —O—$(CF_2)_3$—O— and —O—$CF_2CF_2CF_3$; RS907 (manufactured by DIC Corporation) diluted at 30 wt % in MIBK.

[5] Fluorine-based compound 2: Fluorine-based compound 2 in which 15 wt % of the solid content was dispersed in MIBK, which was prepared according to Preparation Example 4.

(2) Preparation of Low Refractive Layer and Anti-Reflective Film (Examples 1 to 3 and Comparative Examples 1 to 5)

The respective photocurable coating compositions obtained in Table 1 were coated onto the hard coating film described in Table 2 below by #3 mayer bar and dried at 60° C. for one minute. Then, the dried product was irradiated with ultraviolet light of 180 mJ/cm² while pinging the nitrogen gas to form a low refractive layer having a thickness of 110 m, thereby preparing a desired anti-reflective film.

Experimental Example: Measurement of Physical Properties of Anti-Reflective Film The experiments given in the following items were carried out for the anti-reflective films obtained in Examples and Comparative Examples.

1. Alkaline Pretreatment

The respective anti-reflective films obtained in Examples 1 to 3 and Comparative Examples 1 to 5 were immersed in NaOH aqueous solution (solution in which 10 wt % of NaOH was diluted in distilled water) at 30° C. for two minutes and washed with flowing water; and then moisture was wiped off. The anti-reflective films in which moisture has been wiped off was again immersed in NaOH aqueous solution (solution in which NaOH was diluted at 10 wt % in distilled water) at 55° C. for 30 seconds and washed with flowing water; and then moisture was wiped off.

2. Measurement of Reflectance (Y) and Color Coordinate Value (b*)

The average reflectance and the color coordinate value of the anti-reflective films prepared in Examples and Comparative Examples were measured using SolidSpec 3700 (SHIMADZU) before and after alkaline pretreatment.

Specifically, to the surface in which the hand coating layer of the substrate film was not formed, a black tape was attached so as to prevent transmission of light, and the measurement conditions woe set as follows: sampling interval 1 nm, time constant 0.1 sec, slit width 20 nm, medium scanning speed. Then, the low refractive layer of the anti-reflective film was irradiated with a light in the wavelength range of 380 nm to 780 nm at room temperature.

When using HD2 as a hard coating layer, a 100% T mode was applied. When using HD1 as a hard coating layer, a Measure mode was applied. Then, the reflectance in the wavelength range of 380 nm to 780 nm was measured. The measurement results of the reflectance in the wavelength range of 380 nm to 780 nm of the anti-reflective films prepared in Examples and Comparative Examples were shown in FIGS. 1-8. In FIGS. 1 to 8, the dotted lines (----) are graphs showing the reflectance (y-axis) according to the wavelength (x-axis) of the anti-reflective film before alkali treatment, and solid lines (-) are graphs showing the reflectance (y-axis) according to the wavelength (x-axis) of the anti-reflective film after alkali treatment.

The average reflectance and the color coordinate value (b*) in wavelength range of 380 nm to 780 nm of the anti-reflective films prepared in Examples and Comparative Examples were derived from the above reflectance through UV-2401 PC color analysis program and shown in Table 2 below.

3. Measurement of Scratch Resistance

The surfaces of the low refractive layers obtained in Examples and Comparative Examples were rubbed while applying a load to a grade #0000 steel wool and reciprocating ten limes at a speed of 24 rpm. The maximum load that scratches are generated, as observed with the naked eye under a LED 50 W ceiling illumination, was measured. The load is defined as weight (g) per area (2*2 cm$^2$) having a width of 2 cm and a length of 2 cm.

TABLE 2

| | | Example 1 | Comparative Example 1 | Example 2 | Comparative Example 2 | Comparative Example 3 | Example 3 | Comparative Example 4 | Comparative Example 5 |
|---|---|---|---|---|---|---|---|---|---|
| | Hard coating layer | HD2 | HD2 | HD1 | HD1 | HD1 | HD2 | HD2 | HD2 |
| | Low refractive layer | LR1 | LR3 | LR1 | LR3 | LR5 | LR2 | LR4 | LR6 |
| | Wavelength range showing the minimum reflectance [nm] | 540~550 | 480~530 | 510~540 | 510~530 | 550~610 | 510~520 | 540~590 | 560~610 |
| Average reflectance | Before pretreatment | 1.23% | 1.32% | 1.07% | 1.20% | 1.19% | 2.09% | 2.00% | 2.28% |
| | After pretreatment | 1.24% | 1.33% | 1.01% | 1.18% | 1.24% | 2.15% | 2.02% | 2.25% |
| color coordinate value(b*) | Before pretreatment ($b^*_0$) | −3.48 | −1.05 | −2.27 | −2.78 | −6.92 | −1.04 | −2.62 | −2.30 |
| | After pretreatment ($b^*_1$) | −3.04 | −0.15 | −1.84 | −1.93 | −5.87 | −0.74 | −1.54 | −0.86 |
| | $\Delta b^* = b^*_1 - b^*_0$ | 0.44 | 0.9 | 0.43 | 0.85 | 1.05 | 0.3 | 1.08 | 1.44 |
| Scratch resistance | Before pretreatment [unit: g/(2*2 cm$^2$)] | 350 | 200 | 400 | 150 | 200 | 600 | 500 | 450 |
| | After pretreatment [unit: g/(2*2 cm$^2$)] | 250 | 50 | 350 | 50 | 100 | 600 | 300 | 250 |
| | $\Delta S = [(S_0 - S_1)/S_0] \times 100$ | 28.57% | 75.00% | 12.50% | 66.67% | 50.00% | 0.00% | 40.00% | 44.44% |

Referring to Table 2 and FIGS. 1 to 8, it was confirmed that the anti-reflective films of Examples 1 and 2 exhibited a significantly low reflectance and a high scratch resistance in the visible light range (480 to 680 nm) and these characteristics maintained superior levels even after the alkali treatment. In contrast, the anti-reflective films of Comparative Examples 1 to 3 exhibited poor scratch resistance, in particular, the scratch resistance was remarkably degraded after the alkali treatment.

On the other hand, it was confirmed that the anti-reflective films of Example 3 and Comparative Examples 4 and 5 have achieved high scratch resistance by reducing the content of the hollow silica contained in the low refractive layer; but similarly, the anti-reflective films of Comparative Examples 4 and 5 exhibited a remarkably degraded scratch resistance even after the alkali treatment.

Accordingly, it was confirmed that only when using the low refractive layer satisfying the specific conditions of the present invention, the low refractive layer exhibited excellent alkali resistance, thus providing the anti-reflective films showing little change in physical properties before and after the alkali treatment. In particular, although such a low refractive layer was exposed to an alkali according to the preparation process of the polarizing plate, there was less reduction in optical properties such as reflectance and transmittance or in mechanical properties such as wear resistance or scratch resistance. Therefore, it was possible to omit the application of additional protective films for the outer surface protection, and thus the production process was simplified and production costs were reduced. In addition, since the low refractive layer maintained excellent optical and mechanical properties even in the alkali treatment at high temperature, they are expected to contribute greatly to the improvement of productivity and production rate.

The invention claimed is:

1. A low refractive layer, comprising a fluorine-based compound containing a group of —O—$CF_2CF_2$—O—$CF_3$ and 1% to 25% by weight of a polysilsesquioxane compound based on the solid content of the low refractive layer,
   wherein the low refractive layer has a thickness of 1 nm to 300 nm,
   wherein the low refractive layer has a refractive index of about 1.2 to 1.6, and
   wherein the low refractive layer has b* values in a L*a*b* color coordinate system, which satisfy the following formula 1

$$0.5 \geq \Delta b^* = |b^*_1 - b^*_0|$$ [Formula 1]

in the formula 1,
   $b^*_0$ is a b* value in a L*a*b* color coordinate system as defined by the International Commission on Illumination as to the low refractive layer; and
   $b^*_1$ is a b* value in a L*a*b* color coordinate system as measured in the same manner as a method for measuring $b^*_0$ as to the film prepared by immersing the low refractive layer for 2 minutes in 10 wt % sodium hydroxide aqueous solution heated to 30° C., washing the immersed layer with water, wiping off moisture, followed by immersing the wiped layer for 30 seconds in 10 wt % sodium hydroxide aqueous solution heated to 55° C., washing it with water and wiping off moisture.

2. The low refractive layer according to claim 1, wherein the $b^*_0$ value in the formula 1 is from 1 to −8.

3. The low refractive layer according to claim 1, wherein the $b^*_1$ value in the formula 1 is from 1.5 to −8.5.

4. The low refractive layer according to claim 1, wherein the low refractive layer has S values which satisfy the following formula 2:

$$30\% \geq \Delta S = [(S_0 - S_1)/S_0] \times 100$$ [Formula 2]

in the formula 2,
$S_0$ is the maximum load that scratches are not generated, when rubbing the surface of the low refractive layer while applying a load to a grade #0000 steel wool and reciprocating ten times at a speed of 24 rpm; and
$S_1$ is the maximum load that scratches are not generated, as measured in the same manner as a method of measuring $S_0$ with respect to the film prepared by immersing the low refractive layer for 2 minutes in 10 wt % sodium hydroxide aqueous solution heated to 30° C., washing the immersed layer with water, wiping moisture off, followed by immersing the resulting layer for 30 seconds in 10 wt it sodium hydroxide aqueous solution heated to 55° C., and then washing it with water and wiping moisture off.

5. The low refractive layer according to claim 4, wherein the $S_0$ value in the formula 2 is from about 250 to 800 g.

6. The low refractive layer according to claim 4, wherein the $S_1$ value in the formula 2 is from about 200 to 800 g.

7. The low refractive layer according to claim 1, wherein the low refractive layer exhibits a minimum reflectance in the wavelength range of about 480 to 680 nm.

8. The low refractive layer according to claim 1, wherein an average reflectance for light in the wavelength range of 380 to 780 nm is from 0.9 to 2.5%.

9. The low refractive layer according to claim 1, wherein the low refractive layer further includes a photocured product of a coating composition comprising a photopolymerizable compound, inorganic particles and a photopolymerization initiator, and
   wherein the polysilsesquioxane is substituted with at least one reactive functional group.

10. The low refractive layer according to claim 1, wherein the $b^*_0$ value in the formula 1 is from −2.27 to −8.

11. The low refractive layer according to claim 1, wherein the $b^*_1$ value in the formula 1 is from −1.84 to −8.5.

12. An anti-reflective film comprising the low refractive layer of claim 1; and a hard coating layer formed on one surface of the low refractive layer.

13. The anti-reflective film according to claim 12, wherein the hard coating layer includes a binder resin containing a photocurable resin; and organic or inorganic fine particles dispersed in the binder resin.

14. The anti-reflective film according to claim 13, wherein the organic or inorganic fine particles have a particle diameter of 1 to 10 μm.

* * * * *